US010411579B2

(12) United States Patent
Kitada

(10) Patent No.: US 10,411,579 B2
(45) Date of Patent: Sep. 10, 2019

(54) ELECTRIC ROTATING MACHINE

(71) Applicant: KITADA ROTARY ENJINE LLC, Sakai-shi, Osaka (JP)

(72) Inventor: Yasuo Kitada, Sakai (JP)

(73) Assignee: KITADA ROTARY ENJINE LLC, Sakai-Shi, Osaka (JP)

( * ) Notice: Subject to any disclaimer, the term of this patent is extended or adjusted under 35 U.S.C. 154(b) by 331 days.

(21) Appl. No.: 15/311,156

(22) PCT Filed: Feb. 13, 2015

(86) PCT No.: PCT/JP2015/053962
§ 371 (c)(1),
(2) Date: Nov. 14, 2016

(87) PCT Pub. No.: WO2016/103740
PCT Pub. Date: Jun. 30, 2016

(65) Prior Publication Data
US 2017/0098989 A1    Apr. 6, 2017

(30) Foreign Application Priority Data
Dec. 23, 2014   (JP) ................................. 2014-259597

(51) Int. Cl.
*H02K 7/09*     (2006.01)
*H02K 47/20*    (2006.01)
(Continued)

(52) U.S. Cl.
CPC .............. *H02K 47/20* (2013.01); *H02K 7/08* (2013.01); *H02K 7/09* (2013.01); *H02K 9/20* (2013.01);
(Continued)

(58) Field of Classification Search
CPC ............ H02K 47/20; H02K 7/08; H02K 7/09; H02K 55/02; H02K 9/20; H02K 16/04; H02K 3/28; Y02E 40/622
(Continued)

(56) References Cited

U.S. PATENT DOCUMENTS

| 3,931,535 A | 1/1976 | Roesel, Jr. |
| 6,297,575 B1 | 10/2001 | Yang |

(Continued)

FOREIGN PATENT DOCUMENTS

| CN | 1445916 A | 10/2003 |
| CN | 201185380 Y | 1/2009 |

(Continued)

OTHER PUBLICATIONS

Extended European Search Report for European Application No. 15872310.6, dated Jun. 29, 2018.

*Primary Examiner* — Emily P Pham
*Assistant Examiner* — Bryan R Perez
(74) *Attorney, Agent, or Firm* — Birch, Stewart, Kolasch & Birch, LLP

(57) ABSTRACT

The electric rotating machine includes a rotatable rotor including first magnetic field parts and second magnetic field parts formed in front and rear surfaces, respectively, by arranging permanent magnets in a circumferential direction; a first stator equipped with coils opposing the first magnetic field parts disposed, the coils forming first stator magnetic fields; a second stator equipped with coils opposing the second magnetic field parts disposed, the coils forming second stator magnetic fields; and a power feeder for driving the rotor to rotate by supplying power to the coils, and a power collector for extracting an induced current generated in the coils of the other stator resulting from rotation of the rotor. At least the coils disposed on the power supply side are (Continued)

formed by a superconducting material, a current supplied to the superconducting coils being made larger than an induced current generated in the other coils.

12 Claims, 18 Drawing Sheets

(51) Int. Cl.
  *H02K 16/04* (2006.01)
  *H02K 9/20* (2006.01)
  *H02K 55/02* (2006.01)
  *H02K 7/08* (2006.01)
  *H02K 3/28* (2006.01)

(52) U.S. Cl.
  CPC .............. *H02K 16/04* (2013.01); *H02K 55/02* (2013.01); *H02K 3/28* (2013.01); *Y02E 40/622* (2013.01)

(58) Field of Classification Search
  USPC ........................................................ 310/90.5
  See application file for complete search history.

(56) References Cited

U.S. PATENT DOCUMENTS

| 2005/0275359 | A1 | 12/2005 | Takeuchi et al. |
| 2008/0039331 | A1 | 2/2008 | Okazaki et al. |
| 2009/0021095 | A1 | 1/2009 | Tatematsu et al. |
| 2009/0033258 | A1 | 2/2009 | Atarashi |
| 2010/0019604 | A1* | 1/2010 | Haran .................... H02K 21/44 310/178 |
| 2011/0025158 | A1 | 2/2011 | Aiki et al. |
| 2011/0062806 | A1 | 3/2011 | Ohashi et al. |
| 2013/0292941 | A1* | 11/2013 | Mountain .............. H02K 16/04 290/7 |

FOREIGN PATENT DOCUMENTS

| EP | 0 961 044 A2 | 12/1999 |
| EP | 1830455 A1 | 9/2007 |
| EP | 2413483 A1 | 2/2012 |
| GB | 1574326 A | 9/1980 |
| JP | 60-219945 A | 11/1985 |
| JP | 1-153000 A | 6/1989 |
| JP | 1-174294 A | 7/1989 |
| JP | 2-155455 A | 6/1990 |
| JP | 6-165453 A | 6/1994 |
| JP | 9-275673 A | 10/1997 |
| JP | 11-336759 A | 12/1999 |
| JP | 2004-99359 A | 4/2004 |
| JP | 2005-269868 A | 9/2005 |
| JP | 2005-333687 A | 12/2005 |
| JP | 2007-60745 A | 3/2007 |
| JP | 2007-60749 A | 3/2007 |
| JP | 2007-166797 A | 6/2007 |
| JP | 2007-282331 A | 10/2007 |
| JP | 2009-38934 A | 2/2009 |
| JP | 2009-247046 A | 10/2009 |
| JP | 2009-273268 A | 11/2009 |
| JP | 2010-28887 A | 2/2010 |
| JP | 2011-67006 A | 3/2011 |
| JP | 2011-103708 A | 5/2011 |
| JP | 2012-5218 A | 1/2012 |
| JP | 2012-232671 A | 11/2012 |
| JP | 2013-74743 A | 4/2013 |
| JP | 2013-146158 A | 7/2013 |
| WO | WO 02/091548 A1 | 11/2002 |
| WO | WO 2006/068039 A1 | 6/2006 |

* cited by examiner

ELECTRIC ROTATING MACHINE

TECHNICAL FIELD

The present invention relates to an electric rotating machine having a rotor and a stator.

BACKGROUND ART

For example, as an electric rotating machine, there is a synchronous motor generator that is activated as a single motor or generator.

In the hybrid vehicle, an engine and two motor generators are coupled and interlocked to a wheel drive system via a power distribution mechanism, in which one of the motor generators is used for engine start, power assist, and power generation while the other one is used for other purposes such as power assist and regenerative power generation, as disclosed in the Patent Literature 1.

According to Patent Literature 2, two motor generators are connected directly so that both of the motor generators serve as a motor or generator, or one of the motor generators is used as a motor and the other one is used as a generator.

Patent Literature 3 discloses an induction motor and a synchronous motor in which both stators are opposed to each other on inner and outer peripheral surfaces of a cylindrical rotor and both stators have coils with electrical angles shifted from each other by 180 degrees in the circumferential direction.

A rotary electric machine using the principle of inductive repulsion and attraction as disclosed in Patent Literature 4 is configured to generate an electromagnetic force that is to make a permanent magnet rotator return to the center by superimposing, onto a three-phase current that is supplied to a stator of the rotary electric machine using the principle of inductive repulsion and attraction and synchronized to the rotational speed of the permanent magnet rotator, a current shifted from the three-phase current by 90°.

Patent Literature 5 discloses a rotary frequency converter configured such that a motor and a generator are coupled by a shaft so as to deliver and receive power between systems with different frequencies.

CITATION LIST

Patent Literature

Patent Literature 1: Japanese Unexamined Patent Publication JP-A2012-232671
Patent Literature 2: Japanese Unexamined Patent Publication JP-A2010-028887
Patent Literature 3: Japanese Unexamined Patent Publication JP-A2009-247046
Patent Literature 4: Japanese Unexamined Patent Publication JP-A2013-146158
Patent Literature 5: Japanese Unexamined Patent Publication JP-A2009-273268

SUMMARY OF INVENTION

Technical Problem

The arts according to Patent Literatures 1 to 5 allow mode switching in a single motor generator between a motor mode and a generator mode. However, only one of the modes is applicable in each moment without allowing simultaneous application of the two modes, in which it is difficult to maintain the generator mode in a rotor driven in the motor mode.

The present invention aims at providing an electric rotating machine capable of solving such a problem of the conventional arts.

The present invention aims at providing an electric rotating machine enabling continuous power generation by using a single rotor set to the motor mode and the generator mode simultaneously.

The present invention aims at providing an electric rotating machine in which, out of two stators opposed to a single rotor, coils of at least one of the stators are formed by a superconducting body capable of supplying a large current, thus making a difference in the ability of generated magnetic fields so that continuous power generation is realized by enabling power supply to superconducting coils with a high ability and power collection from stator magnetic fields with a low ability.

The present invention aims at providing an electric rotating machine with a single rotor formed into a cylindrical body having both free ends, in which magnetic gap forming means and magnetic position setting means are provided between a first stator or a second stator and the rotor so that continuous power generation is realized by rotating the rotor in a levitated state.

Solution to Problem

Concrete means adapted to solve the problems in the present invention are as follows.

Important concrete means comprises: a rotatable rotor having first magnetic field parts and second magnetic field parts formed in front and rear surfaces, respectively, by arranging permanent magnets in a circumferential direction; a first stator equipped with coils opposing the first magnetic field parts disposed in an outer peripheral surface of the rotor, the coils forming first stator magnetic fields; a second stator equipped with coils opposing the second magnetic field parts disposed in an inner peripheral surface of the rotor, the coils forming second stator magnetic fields; and a case for fixing the first stator and the second stator and surrounding the rotor, further comprising a controller having a power feeder for driving the rotor to rotate by supplying power to the coils of one of the first stator and the second stator, and a power collector for extracting an induced current generated in the coils of the other stator resulting from rotation of the driven rotor, wherein at least the coils of the stator disposed on the power supply side are formed by a superconducting material, a current supplied to the superconducting coils being made larger than an induced current generated in the coils of the other stator.

Therefore, a current supplied to the superconducting coils is made larger to make a clear difference in the ability of generated magnetic fields between the first stator magnetic fields and the second stator magnetic fields, thus allowing continuous power generation by sharing a single rotor in a single electric rotating machine while adopting a motor mode and a generator mode simultaneously.

Another important concrete means is characterized in that: the rotor is formed into a cylindrical body with a circular tube part having the first magnetic field parts and the second magnetic field parts, the circular tube part having both free ends; and, between the first stator or the second stator and the rotor, magnetic gap forming means adapted to form a radial gap and magnetic position setting means adapted to optimize an axially relative position are provided.

Therefore, a single rotor with both free ends can be shared to adopt a motor mode and a generator mode simultaneously, thus allowing continuous power generation efficiently.

Yet another important concrete means is characterized in that: the power feeder is capable of exciting a plurality of pole to the same polarity simultaneously at regular intervals in the circumferential direction of the stator by currents, the currents being supplied to the coils on the power supply side, and/or induced electromotive in the coils on the power collection side can generate the same polarity simultaneously on a plurality of poles at regular intervals in the circumferential direction of the stator.

Therefore, formation of a radial gap between a single rotor with both free ends and a stator and optimization of axially relative position can be made by current supply, and/or formation of a radial gap between a rotor and a stator and optimization of axially relative position can be made by an induced current.

Advantageous Effects of Invention

According to the present invention, the coils of at least one of the first stator and the second stator are formed by a superconducting material, a current supplied to the superconducting coils is made larger than an induced current generated by the coils of the other stator, and a single rotor with magnetic field parts formed at the front and rear thereof using permanent magnets is used to realize a motor mode and a generator mode simultaneously, whereby allowing continuous power generation.

Additionally, according to the present invention, a single rotor with magnetic field parts formed at the front and rear thereof using permanent magnets is formed into a cylindrical body with both free ends and, between the first stator or the second stator and the rotor, magnetic gap forming means and magnetic position setting means are provided to cause the rotor to rotate in a levitated state, whereby allowing continuous power generation.

DESCRIPTION OF EMBODIMENTS

Embodiments of the present invention are explained below based on the drawings.

Figure 1:
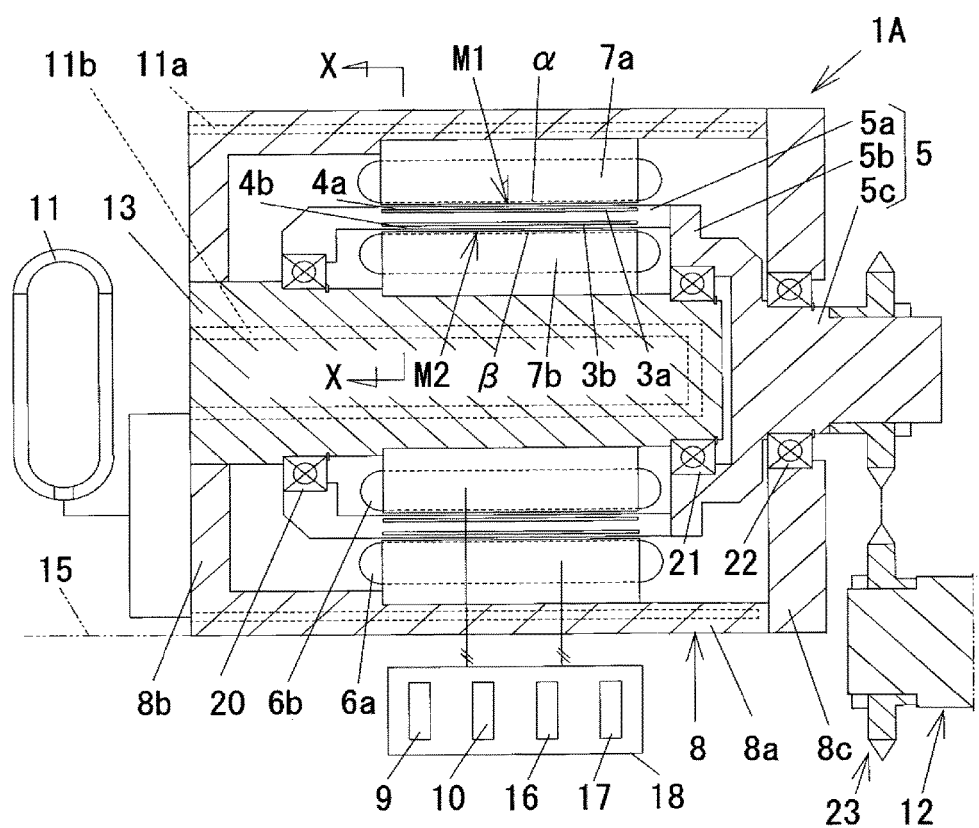
FIG. 1 is a sectional front view showing a first embodiment of the present invention.
Figure 2:
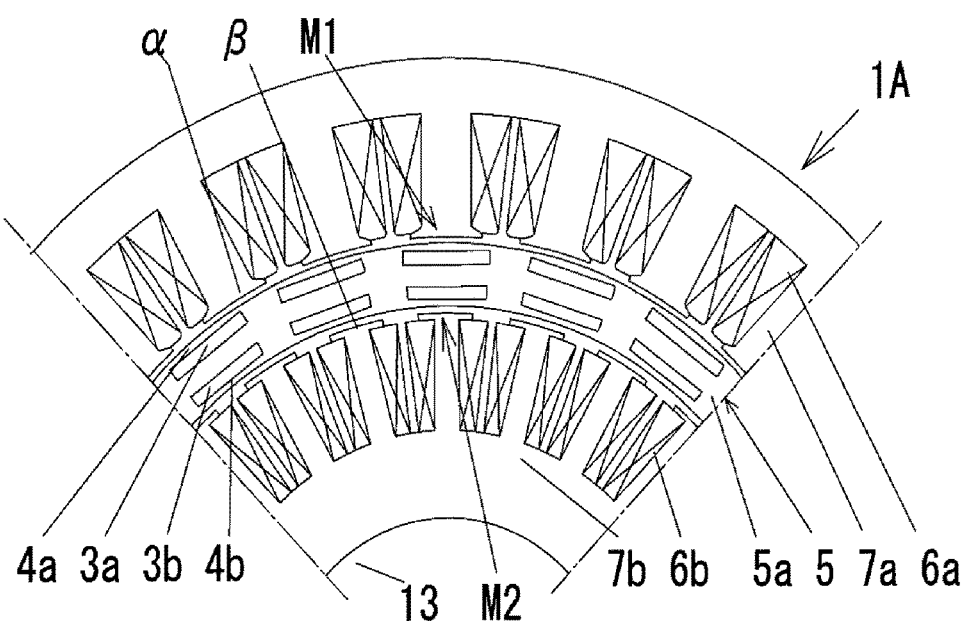
FIG. 2 is a sectional view along X-X line shown in FIG. 1.
Figure 3:
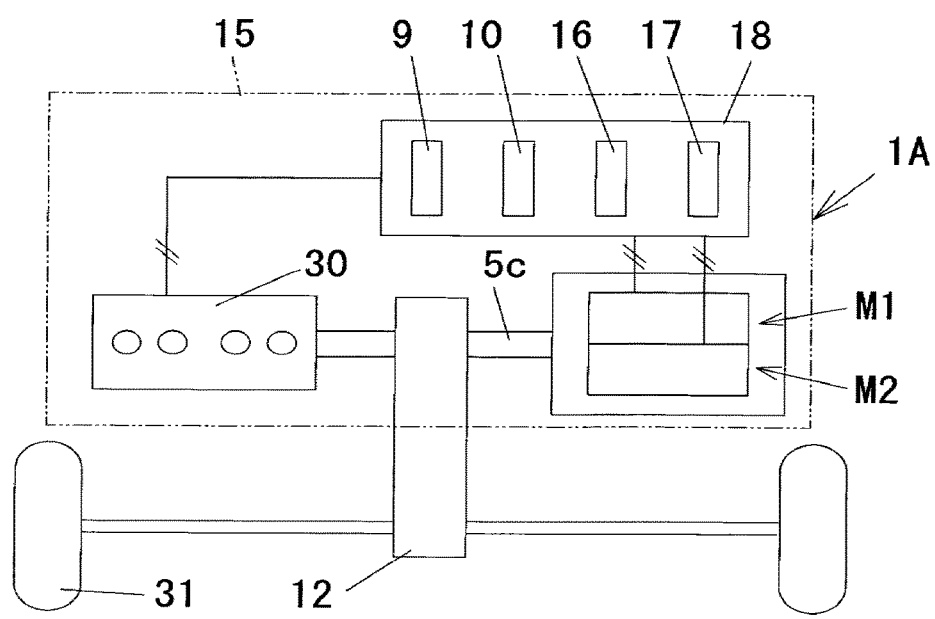
FIG. 3 is a schematic view in which an electric rotating machine according to the first embodiment is applied to a moving machine body.

FIGS. 1 to 6 show an electric rotating machine 1A according to a first embodiment of the present invention. In FIGS. 1 to 3, the electric rotating machine 1A which is a three-phase AC motor generator is mounted on a moving machine body 15 such as a car, train, and ship, connected to a controller 18 including parts such as a power feeder 9, a power collector 10, an inverter (including a converter) 16, and a battery 17, and coupled and interlocked to an external rotary member 12 such as a rotary shaft and propeller shaft of the moving machine body 15.

In FIGS. 1 and 2, the electric rotating machine 1A is roughly divided into a single rotor 5, two stators 7a and 7b, a case 8 for accommodating and supporting these elements, and a support body 13 that is fixed to the case 8 and supports the stator 7b. The stators 7a and 7b can supply and collect a three-phase AC current.

The rotor 5 has a cylindrical circular tube part 5a, a rotary shaft part 5b connected to one end of the circular tube part 5a, and an output shaft part 5c integrally formed with the rotary shaft part 5b. The output shaft part 5c has a free end that protrudes from the case 8. The circular tube part 5a, the rotary shaft part 5b, and the output shaft part 5c are rotatably supported by bearings 20, 21, and 22, respectively, with respect to the case 8.

The circular tube part 5a has circular outer and inner peripheral surfaces at the front and rear thereof. The outer peripheral surface has a plurality of permanent magnets 3a disposed in the circumferential direction to form first magnetic field parts 4a. The inner peripheral surface has a plurality of permanent magnets 3b disposed in the circumferential direction to form second magnetic field parts 4b.

The first stator 7a, which is formed by superposing a number of silicon steel sheets with distributed or concentrated winding of coils 6a, is pressed and fixed to an inner peripheral surface of an outer peripheral wall 8a of the case 8, in which first rotating magnetic fields (or first stator magnetic fields or front rotating magnetic fields) α is formed in the inner peripheral surface. The first rotating magnetic fields α are opposed to the first magnetic field parts 4a of the rotor 5 via a narrow radial gap.

The second stator 7b, which is formed by superposing a number of silicon steel sheets with distributed or concentrated winding of coil 6b, is fitted and fixed to an outer peripheral surface of the horizontal support body 13 fixed to the center of the case 8, in which second rotating magnetic fields (or second stator magnetic fields or rear rotating magnetic fields) β are formed in the outer peripheral surface.

The second rotating magnetic fields β are opposed to the second magnetic field parts 4b of the rotor 5 via a narrow radial gap.

The first magnetic field parts 4a of the rotor 5 and the first rotating magnetic fields α of the first stator 7a constitute an inner rotor motor structure (first rotary part M1). The second magnetic field parts 4b of the rotor 5 and the second rotating magnetic fields β of the second stator 7b constitute an outer rotor motor structure (second rotary part M2). The first rotary part M1 and the second rotary part M2 are set to have an appropriate number of slots and poles.

One end of the horizontal support body 13 is fitted and fixed into a side wall 8b of the case 8 to support one end of the circular tube part 5a of the rotor 5 via the bearing 20, and the other end thereof supports the circular tube part 5a, the rotary shaft part 5b, and the output shaft part 5c via the bearing 21.

The outer peripheral wall 8a of the case 8 has a distribution path 11a formed to distribute a coolant for cooling such as water. The support 13 also has a distribution path 11b formed to distribute a coolant for cooling. These distribution paths 11a and 11b are connected to an external cooling apparatus 11 so that the coolant for cooling can circulate inside the case 8.

Both ends of the circular tube part 5a of the rotor 5 may also be rotatably supported by the case 8 via bearings or the bearings 20, 21, and 22 may also be a radial bearing, thrust bearing, or magnetic bearing.

The first magnetic field parts 4a in the circular tube part 5a of the rotor 5 have an embedded structure in which the permanent magnets 3a are arranged to provide circumferentially alternated S poles and N poles and embedded in magnetic holes formed in the silicon steel sheet. The first magnetic field parts 4a are formed by the permanent magnets 3a in the silicon steel sheet on the outer peripheral surface side. The second magnetic field parts 4b are also formed in the same manner by embedded arrangement of the permanent magnets 3b to provide circumferentially alternated S poles and N poles.

The first magnetic field parts 4a in the circular tube part 5a of the rotor 5 are provided with the permanent magnets 3a set to the same phase in the circumferential direction separately from those of the second magnetic field parts 4b. The mutually opposing permanent magnets 3a form the first magnetic field and the second magnetic field using different polarities so that a magnetic path made of a series of magnetic force lines is formed by pairs of the opposing permanent magnets 3a. However, the first magnetic field and the second magnetic field can also be formed in the same polarity.

FIG. 3 shows a series parallel hybrid system of a vehicle equipped with an internal combustion engine 30, in which the electric rotating machine 1A according to the first embodiment is applied to the vehicle. Without equipment of the internal combustion engine 30, an electric vehicle or train is provided.

The output shaft part 5c of the rotor 5 in the electric rotating machine 1A is coupled and interlocked to the external rotary member 12 such as power transmission means, reduction gear, and power distributor to which a rotational force of the moving machine body 15 is transmitted. A driving force is transmitted from the external rotary member 12 to the internal combustion engine 30 or wheels 31 and a rotational force is transmitted from the internal combustion engine 30 or the wheels 31 to the electric rotating machine 1A.

The controller 18 includes not only a control system for the electric rotating machine 1A but also a vehicle control unit that obtains information on operation of the moving machine body 15 and controls the internal combustion engine 30, an inverter, a converter, and other parts.

In FIGS. 1 to 3, the power feeder 9 included in the controller 18 supplies power to the coils 6 (6a, 6b) of one or both of the first and second stators 7a and 7b to allow driving the rotor 5 to rotate. The power collector 10 can collect generated power from the coils 6 of one or both of the first and second stators 7a and 7b. When power is supplied to one of the first and second stators 7a and 7b, power supply to the other one is suspended to cause power generation.

That is, in any states of the vehicle such as stopping, travelling, and speed reduction, the controller 18 can bring one of the first and second stators 7a and 7b into a motor mode and the other one into a generator mode simultaneously while rotating the common rotor 5.

In particular, in circumstances such as a vehicle travelling at substantially constant speed with small torque fluctuation, requiring a small amount of torque, and reducing the speed, the battery 17 can be charged by supplying power to one of the first and second stators 7a and 7b and bringing the one into the motor mode so as to obtain a driving force, while bringing the other one into the generator mode simultaneously.

Then, because the electric rotating machine 1A can realize the motor mode and the generator mode simultaneously, there is no need to provide another generator driven by the internal combustion engine 30 in addition to a motor generator in the series parallel hybrid vehicle.

The first rotary part M1 and the second rotary part M2 may be differentiated in the ability of output and/or power generation amount or other factors by differentiating the number of slots and the number of the permanent magnets 3b in the second rotating magnetic fields β from the number of slots and the number of the permanent magnets 3a in the first rotating magnetic fields α, or by differentiating the second rotating magnetic fields β and the first rotating magnetic fields α in the coil length.

In the electric rotating machine 1A, the first stator 7a and the second stator 7b are formed by winding ordinary-temperature coils and the cooling apparatus 11 holds a coolant such as water and oil. In the case of using a superconducting material (or superconductive material) to form the coils of at least one of the first and second stators 7a and 7b, the stator S having the superconducting coils is cooled down to a superconduction generating temperature that is a critical temperature or lower by using liquid nitrogen or liquid helium for the coolant of the cooling apparatus 11.

Since the superconducting coils 6 allow a large and strong current to flow, it is possible to increase magnetic field intensity (generated magnetic field ability) in the coils 6 and enhance its ability (generated magnetic field ability) more than an induced current obtained on the power generation side. Even in the case where the length of the coils 6b of the second stator 7b is shorter than the coils 6a of the first stator 7a, the stator magnetic field ability can be enhanced. By providing a superconducting control unit having a persistent current switch and a current limiter or other parts in the controller 18, a strong three-phase AC current and a persistent current can be supplied.

The electric rotating machine 1A can be used as a motor generator, rotary frequency converter, phase converter, voltage converter, or other devices by winding ordinary-temperature coils or superconducting coils in the first stator 7a and the second stator 7b and sharing the rotor 5 therebetween. The electric rotating machine 1A may also be used as a DC motor generator by supplying a DC current to the coils disposed on the power supply side.

Figure 4:
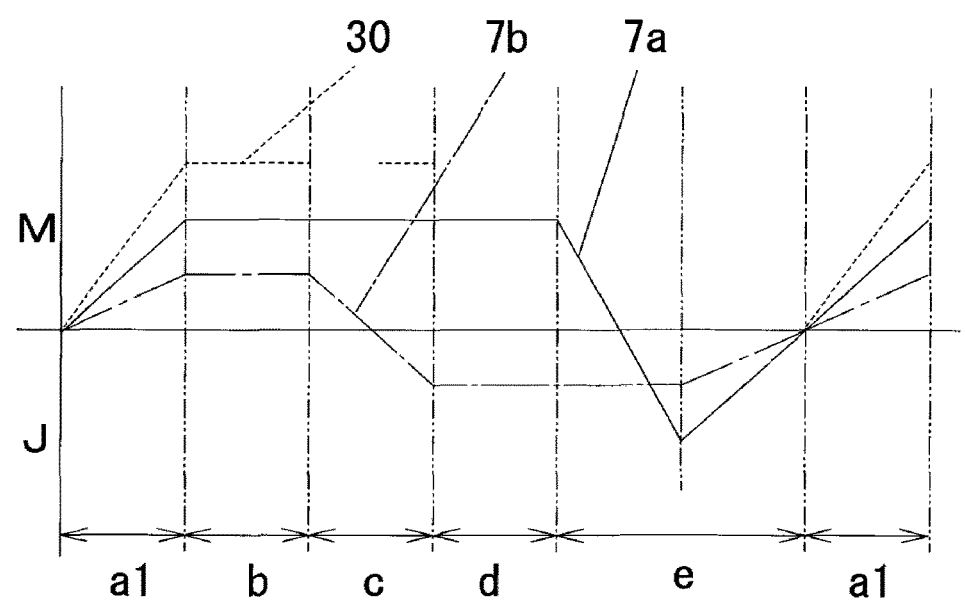
FIG. 4 is an explanatory diagram showing a first operation example of the electric rotating machine.
Figure 5:
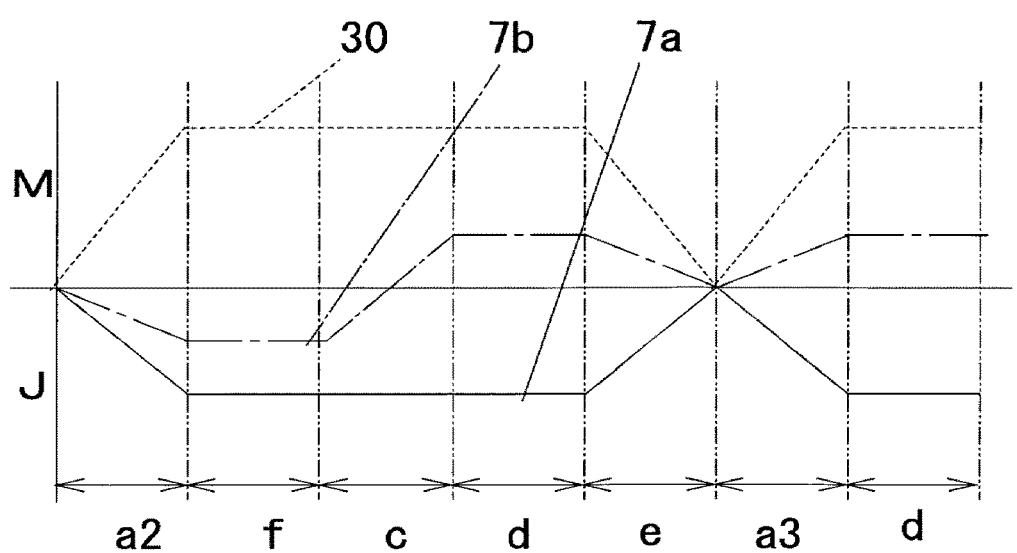
FIG. 5 is an explanatory diagram showing a second operation example of the electric rotating machine.
Figure 6:
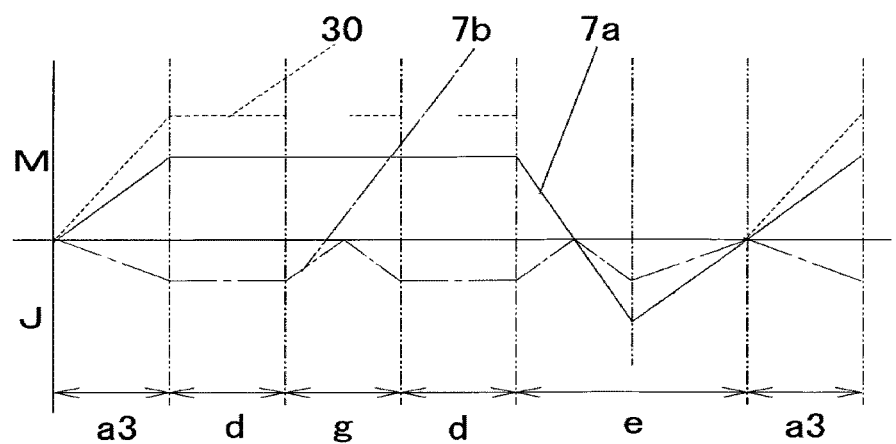
FIG. 6 is an explanatory diagram showing a third operation example of the electric rotating machine.

FIGS. 4 to 6 show operating modes of motor and generator (M, J) in the series parallel hybrid vehicle equipped with the electric rotating machine 1A and the internal combustion engine 30 shown in FIGS. 1 to 3. The coils 6 of the first stator 7a are greater in number (or have higher ability in the magnetic field intensity) than the coils 6 of the second stator 7b. Solid lines refer to operation of the first stator 7a, dashed lines refer to operation of the second stator 7b, and broken lines refer to operation of the internal combustion engine 30.

According to a first operation example shown in FIG. 4, the internal combustion engine 30 is activated from a vehicle stop state and at the same time both the stators 7a and 7b are brought into the motor mode (M) to provide strong motive power in an activation state a1 so that the maximum acceleration and large torque are obtained in a state b. When the state shifts to a state c with constant-speed travel and medium torque, the second stator 7b is changed from the motor mode to the generator mode (J) to obtain power. Also, in the case where a smaller amount of torque is required or a vehicle inertia force is large during constant-speed travel or at speed reduction with a small load, the second stator 7b is held in the generator mode in a state d (constant-speed travel, small torque, and small power generation). Further, at speed reduction or braking, the first stator 7a is brought into the generator mode along with the second stator 7a in a state e to regenerate energy, thus obtaining regenerative energy and a braking force. The internal combustion engine 30 is suspended as appropriate during constant-speed travel with a small travelling load or in the state of having a large vehicle inertia force.

According to the above first operation example, in a later half of the state c and the state d, the motor mode of the first stator 7a and the generator mode of the second stator 7b occur simultaneously at the front and rear of the rotor 5 so that power can be generated by the second stator 7b while transmitting an electric rotational force to the external rotary member 12.

According to a second operation example shown in FIG. 5, the internal combustion engine 30 is activated from a vehicle stop state and at the same time both of the stators 7a and 7b are brought into the generator mode in a state a2. In a state f, the internal combustion engine 30 causes the vehicle to travel at a low speed and large power generation is carried out in both of the stators 7a and 7b. In this case, only large power generation may also be carried out without causing the vehicle to travel. When one of the stators (second stator 7b in this case) is shifted to the generator mode, the state changes from a switching state c to a state d involving constant-speed travel, small torque, and small power generation. Both of the stators 7a and 7b and the internal combustion engine 30 stop operating shown in a state e. Transition is possible from the state e to the state a2 or to a state a3 in which one of the first and second stators 7a and 7b is brought into the generator mode and the other one is brought into the motor mode.

In the second operation example, the motor mode and the generator mode of the first and second stators 7a and 7b occur simultaneously at the front and rear of the rotor 5 in a later half of the state c, the state d, and the state a3.

According to a third operation example shown in FIG. 6, the internal combustion engine 30 is activated and the first stator 7a is brought into the motor mode while the second stator 7b is brought into the generator mode simultaneously in a state a3 which is maintained to a state d (with constant-speed travel, small torque, and small power generation) without making any changes, thus maintaining the generator mode of the second stator 7b. Then, power generation by the second stator 7b is suspended as needed (in a state g) and a state d is also changed to a state e with speed reduction/stop to bring the first stator 7a into the generator mode along with the second stator 7b. By simply reducing a power generation load in the state g, the motor mode and the generator mode of the first and second stator 7a and 7b occur simultaneously at the front and rear of the rotor 5 in the same manner as the state d, thus allowing continuous power generation by the second stator 7b while transmitting an electric rotational force to the external rotary member 12.

The electric rotating machine 1A can be an electric vehicle or train by omitting the internal combustion engine, in which the first state 7a and the second stator 7b can operate in the motor mode and the generator mode simultaneously.

Figure 7:
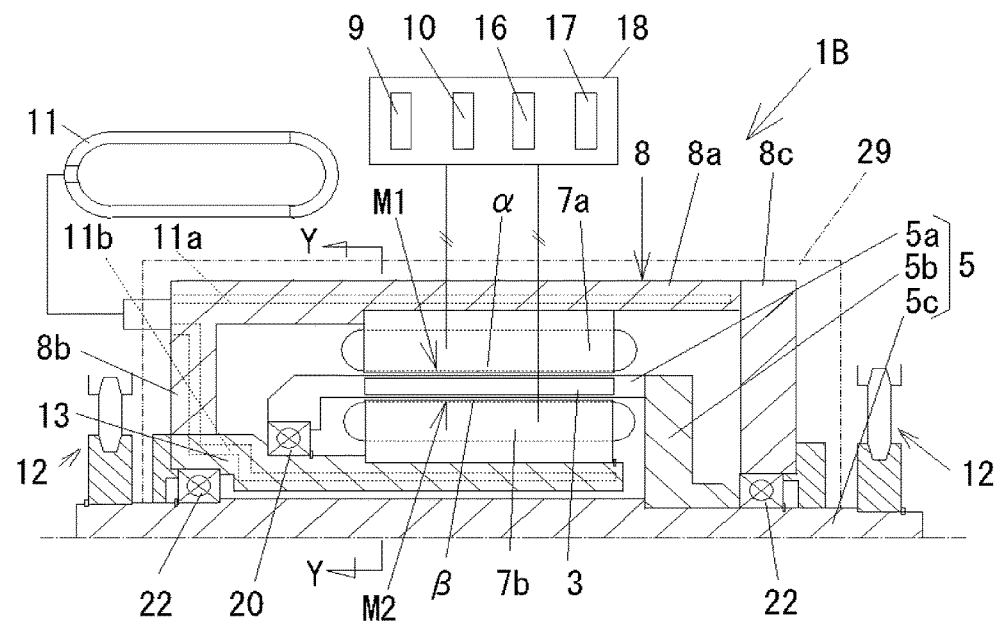
FIG. 7 is a sectional front view showing a second embodiment of the present invention.
Figure 8:
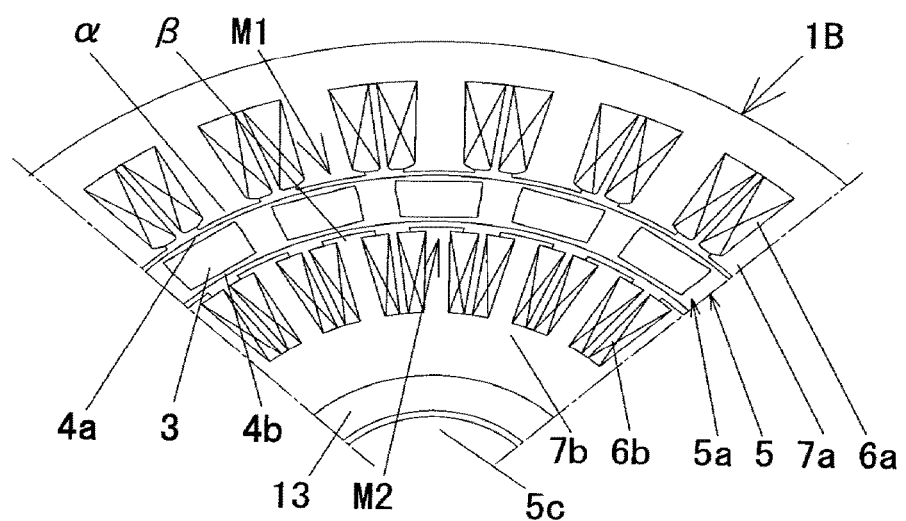
FIG. 8 is a sectional view along Y-Y line shown in FIG. 7.
Figure 9:
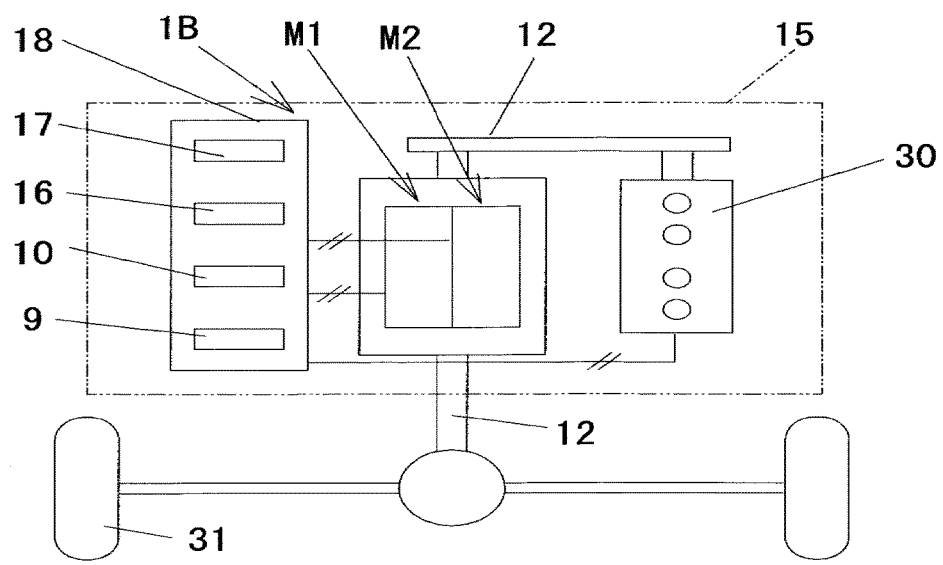
FIG. 9 is a schematic view in which an electric rotating machine according to the second embodiment is applied to a moving machine body.

FIGS. 7 to 9 show a second embodiment in which an electric rotating machine 1B is a three-phase AC motor generator comprising the output shaft part 5c with both ends protruding from the case 8. One end of the output shaft part 5c is interlocked to an output shaft of the internal combustion engine 30 via the external rotary member 12 and the other end thereof is coupled and interlocked to the external rotary member 12 such as a rotary shaft and propeller shaft of the moving machine body 15.

The rotor 5 of the electric rotating machine 1B includes the circular tube part 5a, the rotary shaft part 5b, and the output shaft part 5c formed separately. Both ends of the output shaft part 5c are free ends protruding from the case 8. The support body 13 that supports the stator 7b disposed on the inner periphery side is formed into a cylindrical shape with one end fixed to the case 8 and the other end as a free end. The output shaft part 5c is inserted through the cylindrical tubular support body 13.

The permanent magnets 3 embedded in the circular tube part 5a of the rotor 5 penetrate through the circular tube part 5a, in which N/S poles are disposed in the radial direction. In both radial ends at the front and rear of the circular tube part 5a, the first magnetic field parts 4a having a circular outer peripheral surface and the second magnetic field parts 4b having a circular inner peripheral surface are formed.

Winding of the ordinary-temperature coils 6a and 6b may also be provided in the first stator 7a fixed to the outer peripheral wall 8a of the case 8 and the second stator 7b fitted and fixed to an outer peripheral surface of the support body 13, respectively, or coils made by a superconducting material may also be used in one or both of the stators. In the case of using superconducting coils, the cooling apparatus 11 should correspond to superconduction and an outer periphery of the case 8 is to be surrounded by a heat insulating case 29.

When the first stator 7a and the second stator 7b have winding of superconducting coils to provide the electric rotating machine 1B as a superconducting rotating machine, a bulk magnet is employed as the permanent magnets 3. While the first stator 7a and the second stator 7b are being cooled down to a superconduction generating temperature which is a critical temperature or lower, or after these stators were brought into a critical temperature, mutually opposing pulse magnetic fields that are set to the same phase circumferentially with a controlled waveform are applied to the bulk magnets for magnetization.

The magnetization of bulk magnets is known as a waveform control pulse magnetization method. This magnetization method can be applied between the rotor 5 and the first and second stators 7a and 7b, by which the electric rotating machine 1B is configured. Because the bulk magnet can be demagnetized at high temperature, the bulk can be easily magnetized, demagnetized, and reset at anytime and anywhere without using a magnetizer even after fabrication of an electric rotating machine and an excellent magnetic force of the permanent magnets 3 can be maintained.

Figure 10:
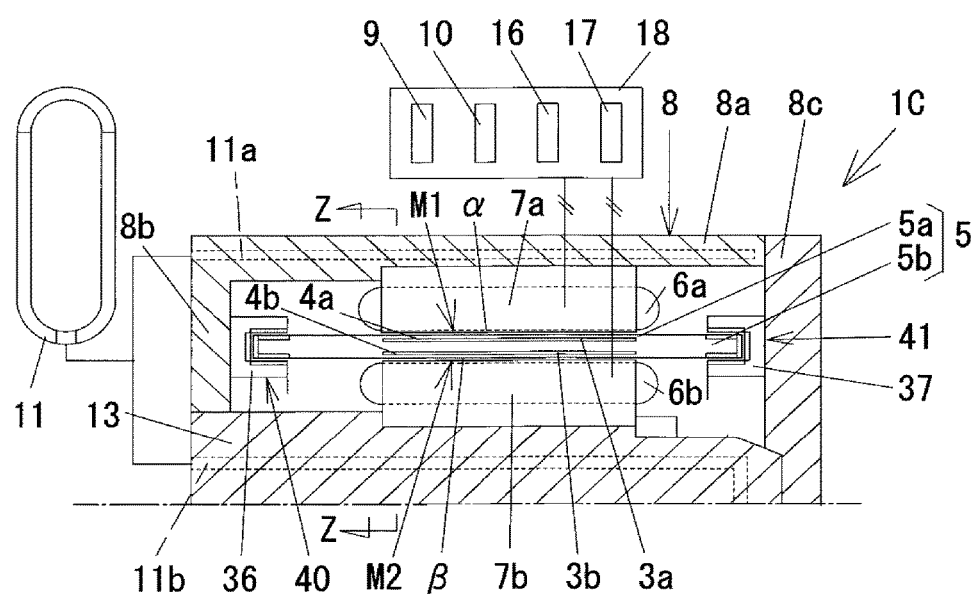
FIG. 10 is a sectional front view showing a third embodiment of the present invention.
Figure 11:
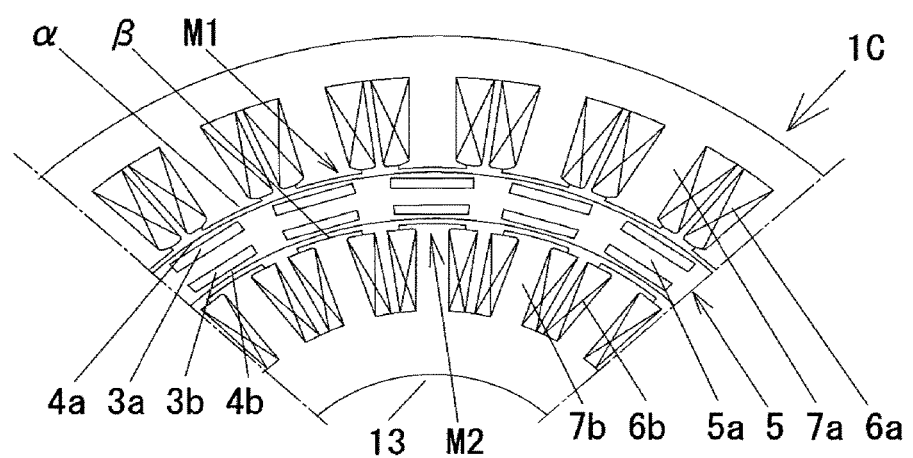
FIG. 11 is a sectional view along Z-Z line shown in FIG. 10.

According to a third embodiment of the present invention shown in FIGS. 10 and 11, an electric rotating machine 10 has the first stator 7a and the second stator 7b for which the number of slots is set differently, and has the rotor 5 in which both ends of the circular tube part 5a are free ends to serve as the rotary shaft part 5b, without having an output shaft part protruding from the case 8. The electric rotating machine 1C can be used as a rotary frequency converter, a cyclone converter, and a variable transmission (DMF) for wind power generator or other devices.

The first stator 7a pressed onto an inner peripheral surface of the case 8 forms the first rotating magnetic fields α in the inner peripheral surface by distributed or concentrated winding of the coils 6a. The second stator 7b fitted to an outer peripheral surface of the support body 13 that is fixed to the side wall 8b of the case 8 also forms the second rotating magnetic fields β in the outer peripheral surface by distributed or concentrated winding of the coil 6b. The number of slots in the second stator 7b is less than that of the first stator 7a, for example, at a ratio of 5:6. An ordinary-temperature coil or a superconducting coil is used for the coils 6.

Similar to the first embodiment, the circular tube part 5a of the rotor 5 has circular outer and inner peripheral surfaces, in which a plurality of the permanent magnets 3a are arranged circumferentially in the outer peripheral surface to form the first magnetic field parts 4a and a plurality of the permanent magnets 3a are arranged circumferentially in the inner peripheral surface to form the second magnetic field parts 4b.

Ring-shaped bearing support members 36 and 37 concentric to the rotary shaft part 5b are formed on inner side surfaces of the side wall 8b and a lid member 8c of the case 8. The bearing support members 36 and 37 have annular grooves formed to insert ends of the rotary shaft part 5b. Permanent magnets or electromagnets, by which the position of the rotary shaft part 5b is restricted in a thrust direction and a radial direction, are provided in the annular grooves and between the inner peripheral surface, outer peripheral surface, and end surfaces of the rotary shaft part 5b, thus providing magnetic bearings 40 and 41.

That is, the magnetic bearings 40 and 41 constitute magnetic gap forming means that forms a radial gap between the rotor 5 and the first stator 7a or the second stator 7b, and magnetic position setting means that optimizes an axially relative position therebetween during rotation of the rotor 5 at high speed. During stop or rotation at low speed of the rotor 5, the magnetic bearings 40 and 41 are activated to constitute gap holding means that forms a radial gap between the rotor 5 and the first stator 7a or the second stator 7b.

The electric rotating machine 1C always allows the motor mode and the generator mode simultaneously occurring between the single rotor 5 and the first and second stators 7a and 7b. When a current is supplied to the second stator 7b at 50 cycles to rotate the rotor 5, the rotor 5 and the first stator 7a constitute a generator operating at 60 cycles. In contrast, when a current is supplied to the first stator 7a at 60 cycles to rotate the rotor 5, the rotor 5 and the second stator 7b constitute a generator operating at 50 cycles. Thus, a current whose frequency was converted from that of a supplied current can be generated.

The power feeder 9 of the controller 18 supplies power to the coils 6 (6a, 6b) of one or both of the first and second stators 7a and 7b so as to drive the rotor 5 to rotate. The power collector 10 can collect power generated from one or both of the coils 6 of the first and second stators 7a and 7b. When power is supplied to one of the first and second stators 7a and 7b, power supply to the other one is suspended so as to generate power.

Thus, at the start of power generation, a current is supplied to the first and second stators 7a and 7b simultaneously to bring these stators into the motor mode and cause rotation of the rotor 5 at high speed, which is followed by bringing one of the stators 7 into the generator mode. When the rotor 5 stops, inertia rotation of the rotor 5 allows regenerative power generation carried out by the first and second stators 7a and 7b simultaneously.

The first rotary part M1 and the second rotary part M2 may also be differentiated in the ability such as the output and the amount of power generation or other factors (difference in the ability derived from the difference in the producible intensity of magnetic field) by differentiating the number of slots and the number of the permanent magnets 3b in the second rotating magnetic fields β from the number of slots and the number of the permanent magnets 3a in the first rotating magnetic fields α, or by differentiating the second rotating magnetic fields β and the first rotating magnetic fields α in the coil length.

Figure 12:
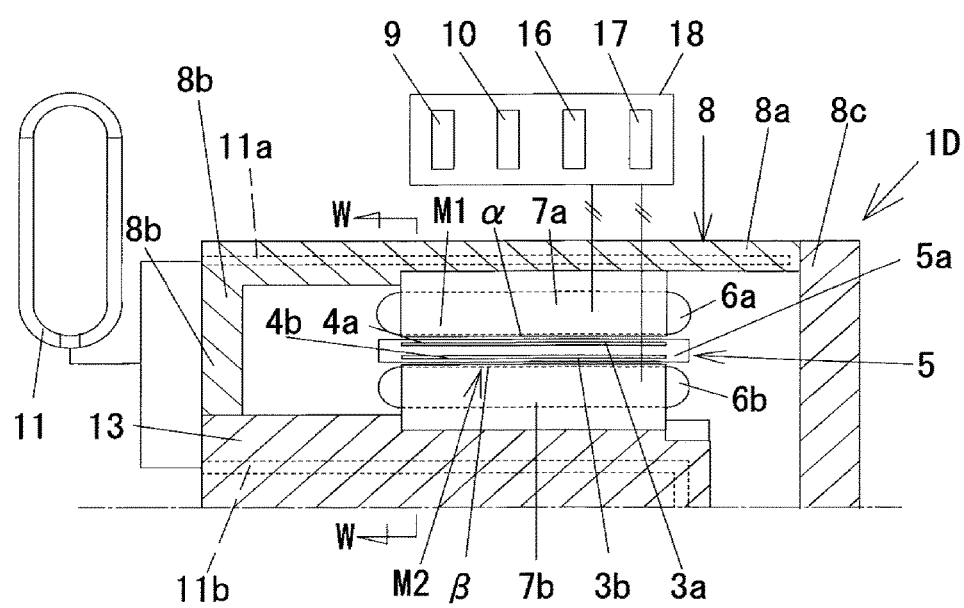
FIG. 12 is a sectional front view showing a fourth embodiment of the present invention.
Figure 13:
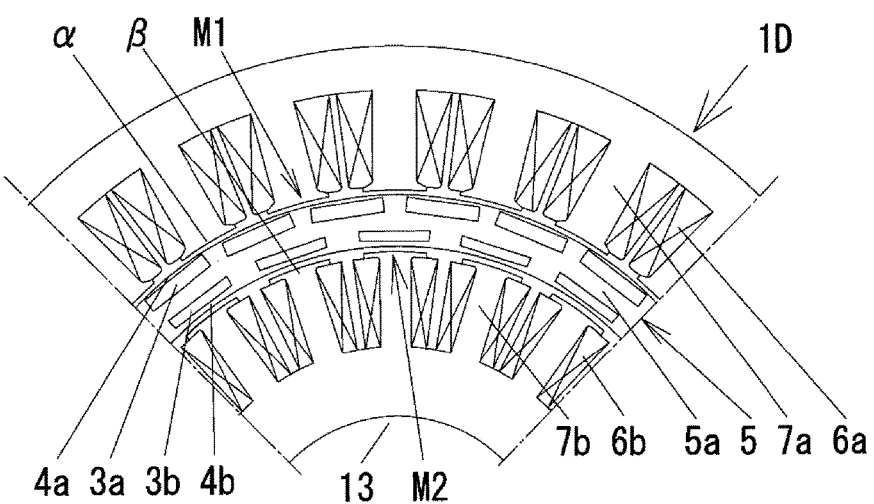
FIG. 13 is a sectional view along W-W line shown in FIG. 12.

According to a fourth embodiment of the present invention shown in FIGS. 12 and 13, an electric rotating machine 1D has the rotor 5 composed of only the circular tube part 5a of a cylindrical shape, the first magnetic field parts 4a formed by arranging a plurality of the permanent magnets 3a circumferentially in the outer peripheral surface, and the second magnetic field parts 4b formed by arranging a plurality of the permanent magnets 3b circumferentially in the inner peripheral surface, in which the permanent magnets 3a and 3b are arranged differently in the number of polarities at a ratio of 5:6. The electric rotating machine 1D can be used as a rotary frequency converter.

An ordinary-temperature or superconduction coil is used for the coils 6a and 6b of the first and second stators 7a and 7b, respectively, and one of the stators is used in the motor mode and the other one is used in the generator mode. A current is supplied to the stator 7 in the motor mode so that the same polarity is formed at two positions shifted by 180°. The same attractive force and repulsive force are generated in the rotor 5 at positions opposed to each other by 180°. An appropriate narrow radial gap is ensured between the rotor 5 and the first and second stators 7a and 7b, while allowing axial positions thereof to be maintained constantly and appropriately by the attractive force.

That is, three slots are set as U phase, V phase, and W phase at 120° intervals and two groups of such phases are created by shifting them at 180° or four groups thereof are created at 90° intervals, whereby the rotor 5 can be supported by the rotating magnetic fields provided by the stators 7.

Identical polarities disposed circumferentially in the stator 7 set to the motor mode may be excited simultaneously at a plurality of positions such as two positions shifted by 180°, four positions shifted by 90°, and eight positions shifted by 45° so that the rotor 5 is levitated by the magnetic force received from the stator 7 set to the motor mode.

Attractive forces or regenerative forces obtained at circumferentially regular intervals between the magnetic field parts 4a and 4b of the rotor 5 and the coils 6a and 6b of the first and second stators 7a and 7b, respectively, serve as magnetic gap forming means in the rotor 5. The attractive forces serve as magnetic position setting means in the rotor 5 relative to the stators 7 in the axial direction so that the rotor 5 is supported rotatably by magnetic bearings between the first and second stators 7a and 7b.

In the electric rotating machines 1C and 1D according to the third and fourth embodiments, respectively, the rotor 5 is supported by magnetic bearings and there is no mechanical friction so that rotation efficiency is high, and rotation loss is small because of rotating only the single rotor 5 as opposed to a rotary frequency convertor having a motor and a generator that are fabricated separately and coupled axially, thus enabling significant improvement of frequency conversion efficiency.

Additionally, in the electric rotating machines 1C and 1D according to the third and fourth embodiments, respectively, it is possible to supply a large current and a persistent current by using a superconducting material to form the coils 6b of the second stator 7b, and an electromagnetic force of such currents can be made larger and stronger than an induced electromotive force excited by the coils 6a of the first stator 7a. That is, the coils 6b of the second stator 7b can be differentiated from the coils 6b of the first stator 7a in the ability so as to generate a stronger magnetic field owing to superconducting characteristics even with a small surface area for magnetic field formation, in which the second stator 7b can also be a generator to extract power continuously.

The electric rotating machines 1A and 1C according to the first and third embodiments, respectively, may also have a structure to form the magnetic field parts at the front and rear of the rotor 5 in which, for example, a plurality of pairs of the permanent magnets 3a, two of which form an inverted V shape, are arranged circumferentially in the inner periphery and the outer periphery of the rotor 5, or different embedded phases are set for the permanent magnets 3a and 3b of the first and second magnetic field parts 4a and 4b, respectively, in the first embodiment, in which the permanent magnets 3b of the second magnetic field parts 4b are positioned between the permanent magnets 3a of the first magnetic field parts 4a in the circumferential direction.

Figure 14:
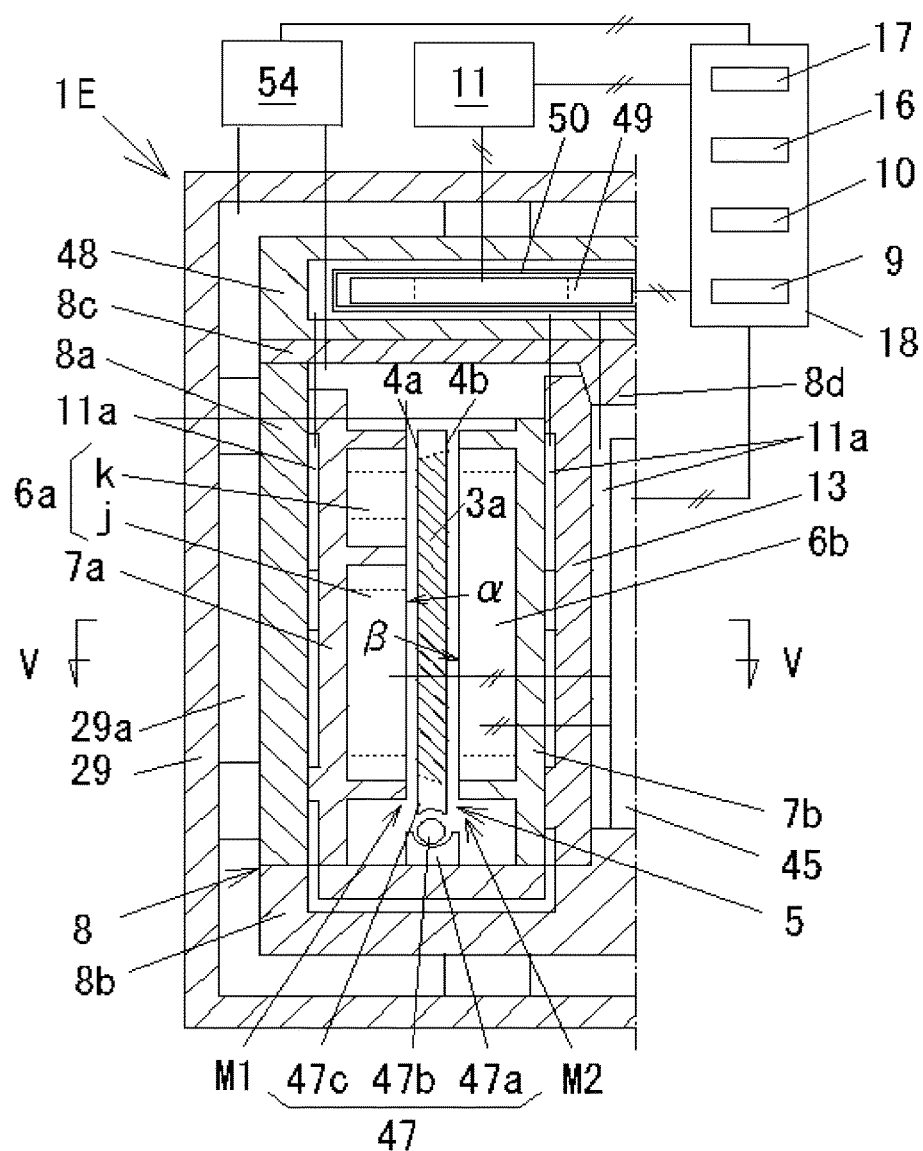
FIG. 14 is a sectional front view showing a fifth embodiment of the present invention.
Figure 15:
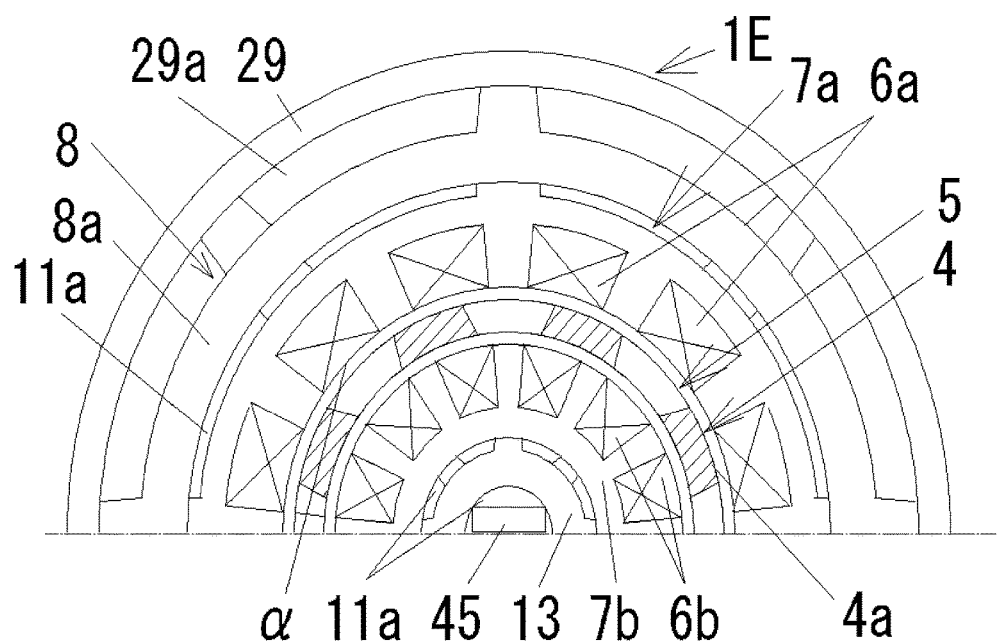
FIG. 15 is a sectional view along V-V line shown in FIG. 14.
Figure 16:
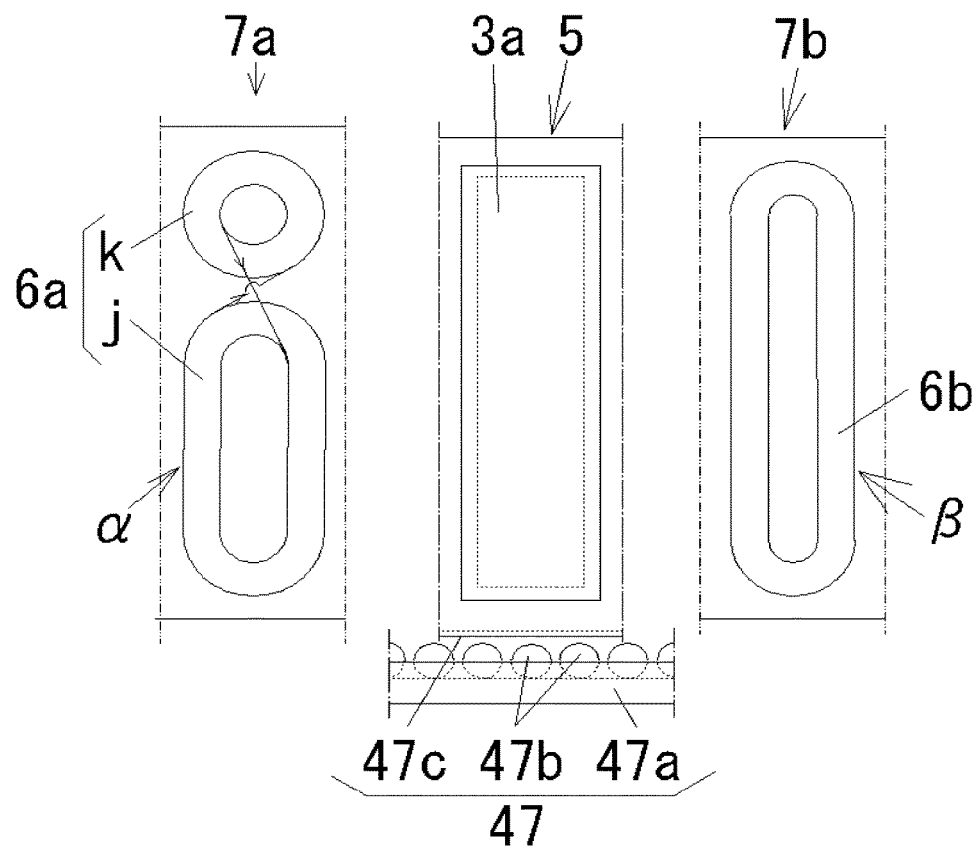
FIG. 16 is a developed explanatory diagram of the fifth embodiment.

According to a fifth embodiment of the present invention shown in FIGS. 14 to 16, an electric rotating machine 1E is a superconducting motor generator for three-phase AC power generation and connected to the controller 18 comprising the power feeder 9, the power collector 10, a superconducting control unit 45, the inverter 16, the battery 17, and other parts.

The electric rotating machine 1E has the single rotor 5, the two stators 7a and 7b, the case 8 for accommodating and supporting these elements, the support body 13 that is fixed to the case 8 and supports the stator 7b, and the heat insulating case 29 for covering the case 8 from the outside. These elements are formed into a cylindrical shape with the axis positioned vertically. The coils 6a and 6b provided in the stators 7a and 7b, respectively, are formed by a superconducting material and can supply and collect a three-phase AC current.

The rotor 5 is formed into a cylindrical body with both free ends in the same manner as the electric rotating machine 1D, and has only the circular tube part without the shaft part connected to the outside. The permanent magnets 3a of the rotor 5 form the first and second magnetic field parts 4a and 4b in both radial ends in the same manner as the electric rotating machine 1B, in which the first magnetic field parts 4a have a smaller area than the second magnetic field parts 4b and these magnetic field parts are embedded so as not to come out of the rotor 5 during rotation. A bulk magnet allowing pulse magnetization with controlled waveform is adopted as the permanent magnets 3a.

The first stator 7a formed by a non-magnetic material or magnetic material such as aluminum alloy and stainless steel is fixed to an inner peripheral surface of the outer peripheral wall 8a of the case 8, equipped with the coils 6a, by which the first rotating magnetic fields (first stator magnetic fields) a are formed in the inner peripheral surface, and opposed to the rotor 5 via a narrow radial gap.

The first magnetic field parts 4a of the rotor 5 and the first rotating magnetic fields $\alpha$ of the first stator 7a provide an inner rotor superconducting generator structure (first rotary part M1) with eight poles and twelve slots. The coils 6a are disposed on the power collection side and connected to the power collector 10 that extracts an induced current generated therein.

In the first stator 7a, each of the coils 6a to form a single pole is divided into a main loop j and a sub-loop k wound oppositely to the main loop j, in which these main loop j and sub-loop k are disposed adjacent to the rotor 5 in the axial direction and connected in the shape of 8 in the vertical direction, and the main loop j has a larger area to oppose the permanent magnets 3 of the rotor 5 than the sub-loop k.

The first magnetic field parts 4a of the rotor 5 are set to the same polarity at circumferentially regular intervals (e.g. 180° intervals). When the coils 6a are opposed to the permanent magnets 3 responsive to rotation of the rotor 5, the main loops j are brought into the same polarity as that of the permanent magnets 3 to generate an electromotive force and a repulsive force due to electromagnetic induction, in which the rotor 5 is pressed toward the axial side at circumferentially regular intervals and therefore a radial gap is formed by magnetism (corresponding to magnetic gap forming means). The induced electromagnetic force flows into the sub-loops k which are then set to a different polarity from that of the permanent magnets 3 so that an attractive force is generated. The attractive force causes the rotor 5 to levitate and serves as magnetic position setting means that optimizes an axially relative position of the rotor 5 to the first stator 7a.

That is, when the rotor 5 rotates, the rotor 5 is made to levitate in the state of being radially concentric to the first stator 7a and held at an axially optimized position, owing to an induced repulsion/attraction effect between the rotor 5 and the coils 6a.

In the first stator 7a, the main loop j and the sub-loop k may have the same area to oppose the permanent magnets 3. However, by making the area of the main loop j larger, an induced electromotive force can be increased and formation of the light-weighted rotor 5 becomes possible with no problem arising with a levitating attractive force which is not large.

The second stator 7b formed by a non-magnetic material or magnetic material such as stainless steel is fitted and fixed to an outer peripheral surface of the support body 13 of a vertical tube shape that is fixed to the center of the case 8. The second stator 7b is equipped with the superconducting coils 6b, by which the second rotating magnetic fields $\beta$ are formed in the outer peripheral surface, and opposed to the second magnetic field parts 4b of the rotor 5 via a narrow radial gap.

The second magnetic field parts 4a of the rotor 5 and the second rotating magnetic fields $\beta$ of the second stator 7b provide an outer rotor superconducting motor structure (second rotary part M2) with eight poles and twelve slots. The superconducting coils 6b are disposed on the power supply side and connected to the power feeder 9 that supplies a current thereto.

Each of the coils 6b to form a single pole corresponds to single loop of a racetrack type, a pancake type or other types, and excited to the same polarity at circumferentially regular intervals to provide an attractive force and a repulsive force to the permanent magnets 3 of the rotor 5, whereby rotating the rotor 5 that is also pressed toward the axis of the second stator 7b (corresponding to magnetic gap forming means). Since the permanent magnets 3 are attracted by an electromagnetic force of the superconducting coils 6b, such an attractive force restrains an axially relative position of the rotor 5 (or generates a levitating force) so that axial movement of the rotor 5 is restricted (corresponding to magnetic position setting means).

That is, when a field current is supplied to the coils 6b to rotate the rotor 5, a repulsion/attraction effect of the rotating magnetic fields occurring between the rotor 5 and the permanent magnets 3 works so that the rotor 5 is levitated in the state of being radially concentric to the second rotator 7b and held in an axially optimized position. A rotary field current supplied to the coils 6b can be excited to the same pole at circumferential intervals such as 180° intervals and 90° intervals.

The second stator 7b has a smaller diameter and volume than the first stator 7a (or a shorter coil length and a smaller surface area to form the magnetic field). The superconducting coil 6b is wound around at least the second stator 7b and connected to a persistent current switch, a current limiter or other parts in the superconducting control unit 45, thereby allowing supply of a three-phase AC persistent current.

An electromagnetic force obtained by supplying a power current and a persistent current to the superconducting coils 6b of the second stator 7b can be made larger and stronger than an induced electromotive force excited by the coils 6a of the first stator 7a. That is, the coils 6b of the second stator 7b can be differentiated in the ability so as to generate a stronger magnetic field than the coils 6b of the first stator 7a owing to superconducting characteristics even in the case where the coils 6b of the second stator 7b have a smaller surface area to form the magnetic field.

The distribution path 11a, by which a coolant can be distributed from the cooling apparatus 11, are formed between the first stator 7a and the case 8, between the second stator 7b and the support body 13, and in the bottom wall 8b of the case 8. The support body 13 has a hollow inside to store a coolant and accommodate the superconducting control unit 45.

The bottom wall 8b in the case 8 is used to fix the outer peripheral wall 8a and the support body 13, and an upper end opening of the outer peripheral wall 8a is covered by the lid member 8c. The lid member 8c has a bottom surface formed with a taper protrusion 8d that is inserted into an upper end opening of the support body 13 to support the upper end of the support body 13.

The case 8 has annular gap holding means 47 arranged in the bottom wall 8b. The gap holding means 47 has a thrust bearing structure in which a large number of rotating bodies 47b are arranged on lower race 47a and an upper race 47c is formed in a lower end surface of the rotor 5. The structure has a weak levitating force during low-speed rotation of the rotor 5 such as the start and stop of rotation and therefore reduces friction with the case 8 by receiving the rotor 5 rotatably. By forming each of the rotating bodies 47b into a spherical body and the upper race 47c into an arc-shaped recessed surface in the gap holding means 47, an effect of alignment to the rotor 5 is obtained. By forming each of the rotating bodies 47b into a conical body and the upper race 47c into a conical surface using the axis of the rotor 5 as a center in the gap holding means 47, an effect of alignment to the rotor 5 is obtained, in which a radial gap is formed and maintained between the rotor 5 and the first stator 7a or the second stator 7b at stopping or during low-speed rotation.

A coolant tank 48 that constitutes the cooling apparatus 11 is mounted or attached onto the lid member 8c of the case 8. The coolant tank 48 is used to store a coolant supplied to the distribution paths 11a and provided with superconducting coils 49 and a magnetic shielding plate 50 so as to serve as a superconducting energy storage device. The coils 49 are connected to the controller 18 so as to store and supply power. The magnetic shielding plate 50 uses a closed loop to shield electromagnetism generated by the coils 49.

The heat insulating case 29 supports the case 8 via a spacer and forms a space 29a. The space 29a and a space inside the case 8 are connected to a vacuum apparatus 54. The space 29a is a vacuum space to prevent propagation of heat from the outside.

In the electric rotating machine 1E according to the fifth embodiment, a current supplied to the superconducting coils 6b of the second stator 7b may be a DC current and power may be supplied to both of the coils 6a and 6b at the start and collected in both of the coils 6a and 6b at the end. The number of poles and slots may also be different from eight poles and twelve slots. The generator frequency may be differentiated from the motor frequency by providing the coils 6a and 6b at a ratio of 6:5, in which conversions such as frequency conversion and voltage conversion may be carried out. Additionally, elements such as the rotor 5, the two stators 7a and 7b, the case 8, and the support body 13 may also be formed by a steel plate with the coils 6a of the first stator 7a being formed by a superconducting material and the support body 13 having a vacuum inside.

By using a superconducting material to form the coils 6b of the second stator 7b in the electric rotating machine 1E in the same manner as the electric rotating machines 1A to 1D according to the first to fourth embodiments, respectively, a large current and a persistent current can be supplied with the intensity of magnetic field (or electromagnetic force) being greater and stronger than an induced electromotive force excited by the coils 6a of the first stator 7a, thus allowing continuous power generation.

Figure 17:
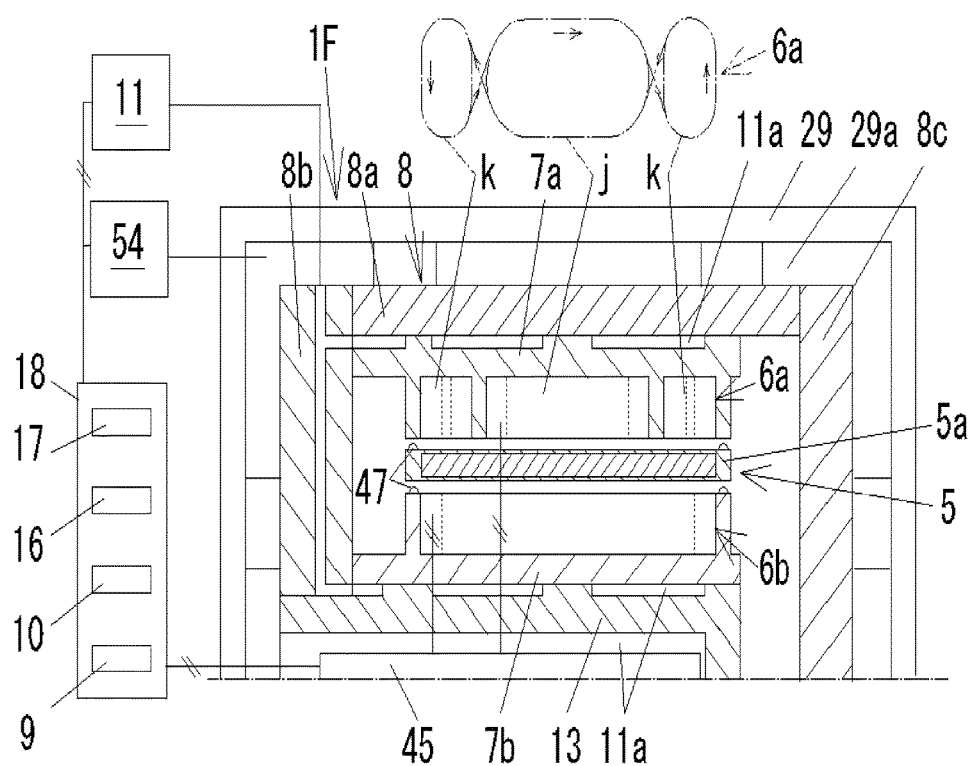
FIG. 17 is a sectional front view showing a sixth embodiment of the present invention.

According to a sixth embodiment shown in FIG. 17, an electric rotating machine 1F is a superconducting motor generator for three-phase AC power generation. As differences to the electric rotating machine 1E, the rotor 5, the stators 7, the case 8, and the support body 13 are formed into a cylindrical shape with the axis positioned laterally and a cavity inside the support body 13 is hollow while communicating with the inside of the heat insulating case 29.

Each of the superconducting coils 6b of the second stator 7b are formed into a single loop of a racetrack type or other types, whereas each of the coils 6a of the first stator 7a is formed by the main loop j and the sub-loops k, by which the main loop j is held on both axial sides of the rotor 5. Each of the sub-loops k is wound oppositely to the main loop j and connected thereto in the shape of 8 (shown by a dashed line in FIG. 17). The main loop j has a larger area to oppose the permanent magnets 3 than the two sub-loops k.

The first magnetic field parts 4a of the rotor 5 are set to the same pole at circumferentially regular intervals. When the coils 6a are faced to the permanent magnets 3 responsive to rotation of the rotor 5, the main loop j is brought into the same pole as the permanent magnets 3 to generate an electromotive force and a repulsive force due to electromagnetic induction, in which the rotor 5 is pressed toward the axis side at circumferentially regular intervals and therefore a radial gap is formed by magnetism. Thus induced current flows into the sub-loops k disposed on both sides of the main loop j so that the sub-loops k are set to a different polarity from that of the permanent magnets 3 and a magnetic attractive force is generated. This attractive force attracts both free ends of the rotor 5 simultaneously by the same intensity of force, thus optimizing an axially relative position of the rotor 5 to the first stator 7a.

Therefore, an induced repulsion/attraction effect occurs between the permanent magnets 3 and the coils 6a so that magnetic gap forming means and magnetic position setting means are provided.

Reference numeral 47 refers to the gap holding means that is a protrusion formed into a semispherical shape by an antifriction material with low frictional resistance. A plurality of the gap holding means are formed in upper outer peripheral surfaces on both axial sides of the second stator 7b, and a large number of the gap holding means are formed in outer peripheral surfaces on both axial free ends of the rotor 5 at circumferentially regular intervals. The gap holding means reduce frictions between the stators 7a and 7b by receiving the rotor 5 rotatably during low-speed rotation of the rotor 5 and form a radial gap at stopping thereof.

In the electric rotating machine 1F, magnetic gap forming means and magnetic position setting means are also provided between the rotor 5 and the superconducting coils 6b using a field current and based on not only magnetic running torque but also a repulsive force and an attractive force.

When a power current and a persistent current are made to flow in the superconducting coils 6b of the second stator 7b, an electromagnetic force thereof can be made greater and stronger than an induced electromotive force excited by the coils 6a of the first stator 7a owing to superconducting characteristics, and there can be a difference in the ability so as to generate a stronger electromagnetic force than the coils 6b of the first stator 7a, thus allowing continuous power generation.

Figure 18:
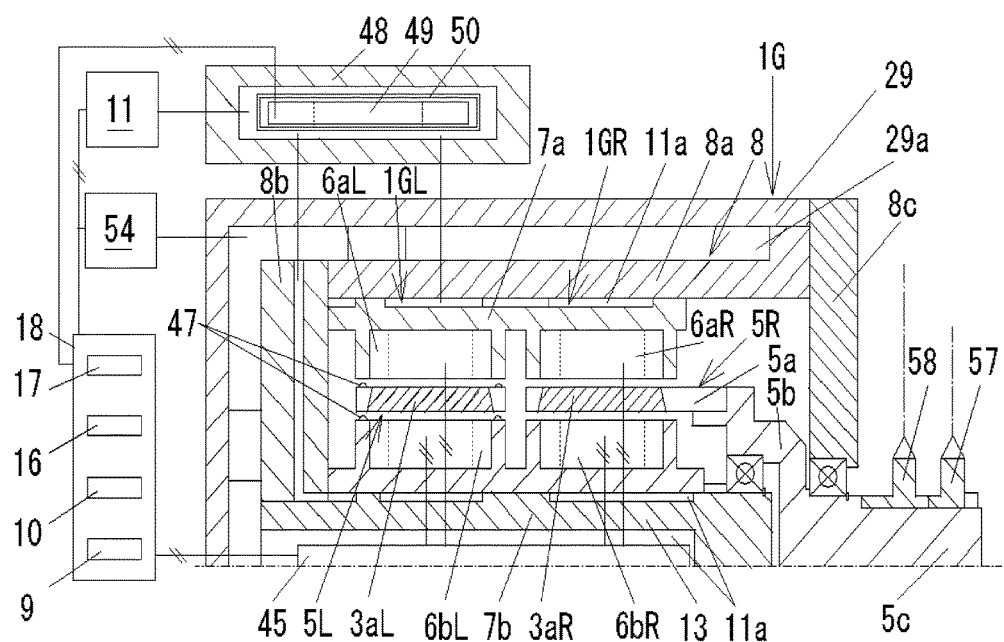
FIG. 18 is a sectional front view showing a seventh embodiment of the present invention.

According to a seventh embodiment shown in FIG. 18, an electric rotating machine 1G has two pairs of superconducting electric rotating machines 1GL and 1GR that are integrated into the case 8 in the axial direction. The electric rotating machine 1GL is a motor generator similar to the electric rotating machine 1D. The electric rotating machine 1GR is a motor generator capable of extracting running torque in the same manner as the electric rotating machine 1A and also serves as a regenerator that regenerates kinetic energy of a moving machine body via an external rotary member.

The electric rotating machine 1G has two rotors 5L and 5R, stators 7a and 7b respectively disposed to inner and outer peripheries, the case 8 for accommodating and storing these elements, the support body 13 that is fixed to the case 8 and supports the stator 7b, and the heat insulating case 29 covering the case 8 from the outside. These elements are formed into a cylindrical shape with the axis positioned laterally.

The first rotor 5L has permanent magnets 3aL embedded therein and has a cylindrical shape with both free ends. The second rotor 5R has the circular tube part 5a with permanent magnets 3aR embedded therein, the rotary shaft part 5b coupled to one end of the circular tube part 5a, and the output shaft part 5c formed integrally with the rotary shaft part 5b.

Opposing the two rotors 5L and 5R, left and right coils 6aL and 6aR are provided in the inner periphery of the first stator 7a and left and right coils 6bL and 6bR are provided in the outer periphery of the second stator 7b, respectively. Each of the coils 6a and 6b is formed by a superconducting material and wound around a single loop of a racetrack shape so as to supply and collect a three-phase AC current.

The coils 6aL, 6aR, 6bL, and 6bR are connected to the superconducting control unit 45. The distribution paths 11a in the stators 7a and 7b are connected to the cooling apparatus 11. A space inside the case 8 and the space 29a inside the heat insulating case 29 are connected to the vacuum apparatus 54.

Two transmission bodies 57 and 58 provided in the output shaft part 5c of the second rotor 5R are coupled and interlocked to the external rotary member 12 such as power transmission means, reduction gear, and power distribution device to which a rotation force of the moving machine body 15 is transmitted, and also coupled and interlocked to the cooling apparatus 11 and the vacuum apparatus 54 so as to drive these apparatuses.

The electrical rotating machine 1G drives the two rotors 5L and 5R to rotate with a power current obtained by supplying a large current and a persistent current to the superconducting coils 6bL and 6bR, and a induced current is collected from the coils 6aL and 6aR while, at the same time, a rotational driving force is extracted from the output shaft part 5c of the second rotor 5R. Power supply and power collection can be realized simultaneously or independently in the coils 6aL, 6aR, 6bL, and 6bR.

Even though the present invention involves the above embodiments provided with the structures, shapes of the respective members, and the positional relationships in the best mode as shown in FIGS. 1 to 18, these members and features may be modified variously and combination thereof may also be changed.

For example, a superconducting coil may be used for the coils 6 of the stators 7 in the motor mode to provide a superconducting electric rotating machine or the cooling apparatus may be omitted for use in 3K cosmic background radiation space.

REFERENCE SIGNS LIST

1 Electric rotating machine
3 Permanent magnet
5 Rotor
5a Circular tube part
5b Rotary shaft part
5c Output shaft part
6 (6a, 6b) Coil
7 Stator
8 Case
9 Power feeder
10 Power collector
11 Cooling apparatus
12 External rotary member

The invention claimed is:
1. An electric rotating machine comprising:
a rotatable rotor having first magnetic field parts and second magnetic field parts formed in an outer peripheral surface and an inner peripheral surface of a circular tube part, respectively, by arranging permanent magnets in a circumferential direction;

a first stator equipped with coils opposing the first magnetic field parts disposed in the outer peripheral surface of the rotor, the coils forming first stator magnetic fields;

a second stator equipped with coils opposing the second magnetic field parts disposed in the inner peripheral surface of the rotor, the coils forming second stator magnetic fields;

a case for fixing the first stator and the second stator and surrounding the rotor;

a controller having a power feeder for driving the rotor to rotate by supplying power to the coils of one of the first stator and the second stator; and a power collector for extracting an induced current generated in the coils of the other stator resulting from rotation of the driven rotor, wherein at least the coils of the stator disposed on the power supply side are formed by a superconducting material, a current supplied to the superconducting coils being made larger than an induced current generated in the coils of the other stator, wherein the rotor is capable of rotating in a levitated state and is formed into a cylindrical body with the circular tube part having the first magnetic field parts and the second magnetic field parts, the circular tube part having both free ends, and between the coils of the first stator and the coils of the second stator are the permanent magnets of the rotor, and wherein a magnetic gap forming device configured to form a radial gap by causing the rotor to levitate due to magnetism, and a magnetic position setting device configured to optimize an axially relative position of the levitated rotor are provided.

2. The electric rotating machine according to claim 1, wherein the controller has a superconducting control unit having a persistent current switch and a current limiter, and wherein a persistent current can be supplied to the superconducting coils disposed on the power supply side.

3. The electric rotating machine according to claim 1, wherein the coils of the second stator are formed by the superconducting material and are connected to the power feeder, wherein the coils of the first stator are connected to the power collector, and wherein a current supplied to the superconducting coils of the second stator is made larger than an induced current generated in the coils of the first stator.

4. The electric rotating machine according to claim 1, wherein the power feeder is capable of exciting a plurality of poles to the same polarity simultaneously at regular intervals in the circumferential direction of the stator by currents, the currents being supplied to the coils on the power supply side.

5. The electric rotating machine according to claim 1, wherein induced currents in the coils on the power collection side can generate the same polarity simultaneously on a plurality of poles at regular intervals in the circumferential direction of the stator.

6. The electric rotating machine according to claim 5, wherein each of the coils provided at circumferential intervals in the stator on the power collection side has a main loop and a sub-loop wound oppositely to the main loop, the main loop and the sub-loop being adjacent to each other in the axial direction of the stator and connected in the shape of an 8, the main loop having a larger area to oppose the permanent magnets of the rotor than the sub-loop.

7. The electric rotating machine according to claim 1, further comprising a gap holding device configured to form and maintain a radial gap between the rotor and the first stator or the second stator at stopping of the rotor.

8. The electric rotating machine according to claim 1, wherein a plurality of groups each including the rotor, the first stator, and the second stator are provided in the axial direction of the rotor, one of the rotors being formed in the cylindrical body having both free ends and levitated by magnetism, the other rotor having an end part coupled to an output shaft part protruding outside the case.

9. The electric rotating machine according to claim 1, wherein the first magnetic field parts and the second magnetic field parts are arranged differently in the number of polarities, the first stator magnetic fields and the second stator magnetic field are differentiated in the length of the coils, or the first stator and the second stator for which the number of slots is set differently.

10. The electric rotating machine according to claim 1, wherein the coils of both the first stator and the second stator are formed by the superconducting material, and the electric rotating machine comprises a superconducting cooling apparatus for cooling the superconducting coils to a critical temperature or lower, the superconducting cooling apparatus having a coolant tank for storing a coolant, the coolant tank storing superconducting coils for power storage, the coolant in the coolant tank being supplied to the stator.

11. The electric rotating machine according to claim 1, wherein the coils of both of the first stator and the second stator are formed by the superconducting material, wherein the permanent magnets are embedded in the circular tube part of rotor to form the first magnetic field parts having a circular outer peripheral surface and the second magnetic field parts having a circular inner peripheral surface of the rotor in both ends of the permanent magnets, and wherein the permanent magnets are excited and magnetized to a superconducting bulk embedded in the circular tube part by supplying pulse magnetic fields set to a different polarity at the same phase circumferentially with a controlled waveform to the superconducting coils of both of the first stator and the second stator, while or after bringing the superconducting bulk to a critical temperature.

12. The electric rotating machine according to claim 1, further comprising a superconducting cooling apparatus for cooling the superconducting coils to a critical temperature or lower, the superconducting cooling apparatus having a coolant tank for storing a coolant, the coolant tank storing superconducting coils for power storage, the coolant in the coolant tank being supplied to the stator.

* * * * *